United States Patent Office 2,832,735
Patented Apr. 29, 1958

2,832,735

METHOD OF INHIBITING CORROSION OF METALS

William B. Hughes, Tulsa, Okla., assignor to Cities Service Research and Development Company, New York, N. Y., a corporation of New Jersey No Drawing. Application November 17, 1955
Serial No. 547,536

6 Claims. (Cl. 252—8.55)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, and storage equipment. This type of corrosion is particularly noticeable in wells producing brines which contain varying amounts of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizing and reducing corrosion in wells producing oil-brine mixtures, and particularly reducing corrosion in wells in which large amounts of brine are produced as compared to oil.

I have discovered that certain bis-thiazoline structures obtained by first reacting a mol of dicarboxylic acid with 2 mols of monoethanolamine to provide a reaction product in which the oxygen is thereafter replaced with sulfur have uniquely effective corrosion inhibiting characteristics.

The initial reaction product obtained in the reaction of 2 mols of the monoethanolamine with the dicarboxylic acid is the bis-oxazoline. Replacement of the oxazoline ring oxygen by sulfur to provide the bisthiazoline is carried out according to the method described by Morton in the Chemistry of Heterocyclic Compounds, McGraw-Hill, page 419. This final product provides most effective inhibiting of corrosion when added to corrosive well fluids in comparatively small amounts.

In carrying out the preparation of the bis-thiazoline compounds utilized in my invention, I first prepare the bis-oxazoline intermediate reaction product by reacting one mol of a dicarboxylic acid with two mols of monoethanolamine in the presence of an azeotrope forming solvent. For such purposes I have found benzene quite satisfactory. Accordingly, approximately 50 ml. of benzene is added to the mixture and distillation carried out until the theoretical amount of water obtainable from the reaction of both carbonyl groups is recovered. In the present reaction the theoretical amount of recoverable water is about 36 grams or two mols. After the reaction has been completed, the bis-oxazoline is washed and dried. To this dried intermediate product approximately one-half mol of phosphorous penta sulfide is added. The mixture is heated to a temperature of about 200° C. for a period of from 1–3 hours. The bisthiazoline product is washed and dried.

While it is essential that the amine be the monoethanolamine, a number of dicarboxylic acids can be used. I have found, however, that certain of the dicarboxylic acids are to be preferred. These are succinic, sebacic, terephthalic, mucic and dimer acids.

In order to more clearly understand the method by which the bisthiazoline structures of my invention may be prepared, the following examples are given:

EXAMPLE 1

To 300 grams (0.5 mol) of dimerized linoleic acid prepared according to directions given in "Journal of American Oil Chemists Society," 24, 65 (March 1947), and hereafter referred to as dimer acid, 61 grams (1.0 mol) of monoethanolamine and 50 ml. of benzene were added. The mixture was heated to a temperature of about 90° C. under a water trap condenser to distill the water-benzene azeotropic mixture resulting from the conversion of the acid carboxyl oxygens to water. Condensed benzene was continuously returned through the decanter stillhead to the reaction vessel. As the end of a four hour heating period, 35.8 grams of water had been removed from the reaction, representing substantially the theoretical quantity which could be expected from the conversion of both carbonyl groups to water in forming the bis-oxazoline. Benzene remaining after the heating period was removed by distillation. The reaction product was washed with water to remove excess amine, returned to the reactor, and dried by benzene distillation. To this product 27.7 grams (0.4 mol) of phosphorus penta sulfide was added with heating to cause replacement of the oxazoline oxygen with sulfur. After heating for 90 minutes at 200° C. the product was washed with 10% sodium bicarbonate solution to remove the phosphorus pentoxide formed in the reaction as well as any excess phosphorus pentasulfide. The bis-thiazoline product was washed with water and dried by benzene distillation. The resulting product contained both sulfur and nitrogen and had a molecular weight, according to the method of Rast (Ber. 55, 1051, 3727: 1932), of 684. The theoretical molecular weight is 686. The effectiveness of this compound as a corrosion inhibitor is shown in Table I which follows. The product is identified in the table as inhibitor No. 1.

EXAMPLE 2

Following the procedure followed in Example 1 above, 83.0 grams (0.5 mol) of tere-phthalic acid was added to 61 grams (1.0 mol) of monoethanolamine; 50 ml. of benzene was added to form a benzene-water azeotrope. After recovery of approximately 36 grams of water, the reaction product was treated with phosphorous penta sulfide (approximately 0.5 mol) to provide a bis-thiazoline product. This product had a molecular weight of 250 as compared to the accepted value of 252. The product is identified as inhibitor 3 in Table I which follows.

EXAMPLE 3

According to the method of Example 1, 101 grams (0.5 mol) of sebacic acid was mixed with 61 grams (1.0 mol) of monoethanolamine. Water was recovered as previously described and the bis-oxazoline product treated with phosphorous penta sulfide to effect replacement of ring oxygen with sulfur. The product was recovered and tested as a corrosion inhibitor. The results of this test appear in the table which follows. The product is identified therein as inhibitor number 2.

EXAMPLE 4

Following the method of Example 1, 59 grams (0.5 mol) of succinic acid was mixed with 61 grams (1.0 mol) of monoethanolamine. Water was recovered as previously described and the bis-oxazoline product treated with phosphorous penta sulfide to effect replacement of ring oxygen with sulfur. The product was recovered and tested as corrosion inhibitor number 1. The result of this test appears in the table which follows.

EXAMPLE 5

According to the method of Example 1, 105 grams (0.5 mol) of mucic acid was mixed with 61 grams (1.0 mol) of monoethanolamine. Water was recovered as previously described and the bis-oxazoline product treated with phosphorous penta sulfide to effect replacement of ring oxygen with sulfur. The product was recovered and tested as a corrosion inhibitor. The results of this test appear in the table which follows in which the product is identified as inhibitor number 4.

The effectiveness of my compositions in reducing the corrosiveness of oil field brine may be more fully understood by reference to certain tests which I have conducted, using prepared brines to substantially duplicate well conditions. A test procedure involved a measurement of the corrosion action of a hypothetical well fluid as inhibited with compositions described above upon weighed, cleaned, and polished strips of number 18 gauge cold rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor being tested was added to each flask in amounts ranging from 10 to 50 p. p. m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The change in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1-L2}{L1} \times 100$$

in which L1 is the loss in weight of strips taken from uninhibited test fluids, and L2 is the loss in weight of strips which were subjected to inhibited test fluids.

The results of tests carried out with bis-thiazoline structures of my invention are summarized in the table below. For each of the acids recorded, it is understood that bis-thiazoline was prepared by reaction of the acid with the monoethanolamine. Under "Percent protection," three columns are provided for respective test results obtained when utilizing 50, 25, and 10 p. p. m. respectively of the specific bis-thiazoline compounds.

Table 1

| Inhibitor No. | Acid Used | Percent Protection | | |
|---|---|---|---|---|
| | | 10 p.p.m. | 25 p.p.m. | 50 p.p.m. |
| 1 | Succinic | 78.5 | 86.1 | 90.3 |
| 2 | Sebacic | 80.6 | 93.7 | 92.8 |
| 3 | Terephthalic | 96.4 | 98.9 | 99.0 |
| 4 | Mucic | 42.0 | 86.3 | 93.1 |
| 5 | Oxalic | 12.6 | 19.3 | 38.7 |
| 6 | Dimer | 81.2 | 96.4 | 98.4 |

It will be noted from the foregoing that the bis-thiazolines prepared by reacting oxalic with the 2-amino ethanol provide bis-thiazoline structure which, at 50 p. p. m., provided very poor protection against the corrosion-producing elements in the brine as compared to the longer chain dibasic acids, represented by sebacic, succinic, and dimerized linoleic acid.

It will be evident from the foregoing table that corrosion may be effectively reduced to a value of one-tenth or less of that due to the natural flow of well fluids through the well tubing and pipe lines by incorporating in the well fluid comparatively small quantities of the bis-thiazoline compounds.

In using my improved compositions for protecting the piping, casings, and other equipment which come in contact with the corrosive fluids, I have found that excellent results may be obtained by injecting an appropriate quantity, generally not more than 100 p. p. m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved corrosion inhibitors is not fully and clearly understood but apparently the bis-thiazoline compounds of this invention preferentially wet the surface of the metal equipment with oil, thus excluding the brine from contact with the metal. In any event despite the lack of the complete understanding of the mechanism of the inhibiting effect accomplished by the bis-thiazoline compounds utilized in my invention, it is quite evident that they are extremely and surprisingly effective in protecting oil well tubing and field equipment from corrosion even when used in amounts of 50 p. p. m. or less.

It is to be understood that the improved compositions of my invention are not limited to use alone and may be applied along with other agents commonly introduced in the producing oil wells for breaking emulsions, preventing scale formation, minimizing pitting, etc. It is further evident that my invention is not restricted to the use of improved compositions for inhibiting corrosion in oil wells, but may be employed to perform this function in the presence of corrosive brines derived from other sources.

Having now described my invention, what I claim as new and useful is:

1. The method of inhibiting corrosion of ferrous metals when exposed to contact with corrosive fluids which include an acidic component selected from the group consisting of carbon dioxide and hydrogen sulphide which comprises introducing into said fluid in contact with said ferrous metal a corrosion inhibiting amount of a compound having the formula

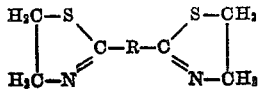

in which R is the residue of a dicarboxylic acid selected from the group consisting of dimer, terephthalic, sebacic, succinic and mucic acids.

2. The method according to claim 1 wherein the dicarboxylic acid is dimer acid.
3. The method according to claim 1 wherein the dicarboxylic acid is terephthalic acid.
4. The method according to claim 1 wherein the dicarboxylic acid is sebacic acid.
5. The method according to claim 1 wherein the dicarboxylic acid is succinic acid.
6. The method according to claim 1 wherein the dicarboxylic acid is mucic acid.

References Cited in the file of this patent
UNITED STATES PATENTS

| | | |
|---|---|---|
| 2,215,092 | Beekhuis | Sept. 17, 1940 |
| 2,351,657 | Bayes | June 20, 1944 |
| 2,383,681 | Pinkney et al. | Aug. 28, 1945 |
| 2,544,001 | Zerbe | Mar. 6, 1951 |
| 2,691,631 | Metler | Oct. 12, 1954 |